Patented Oct. 6, 1936

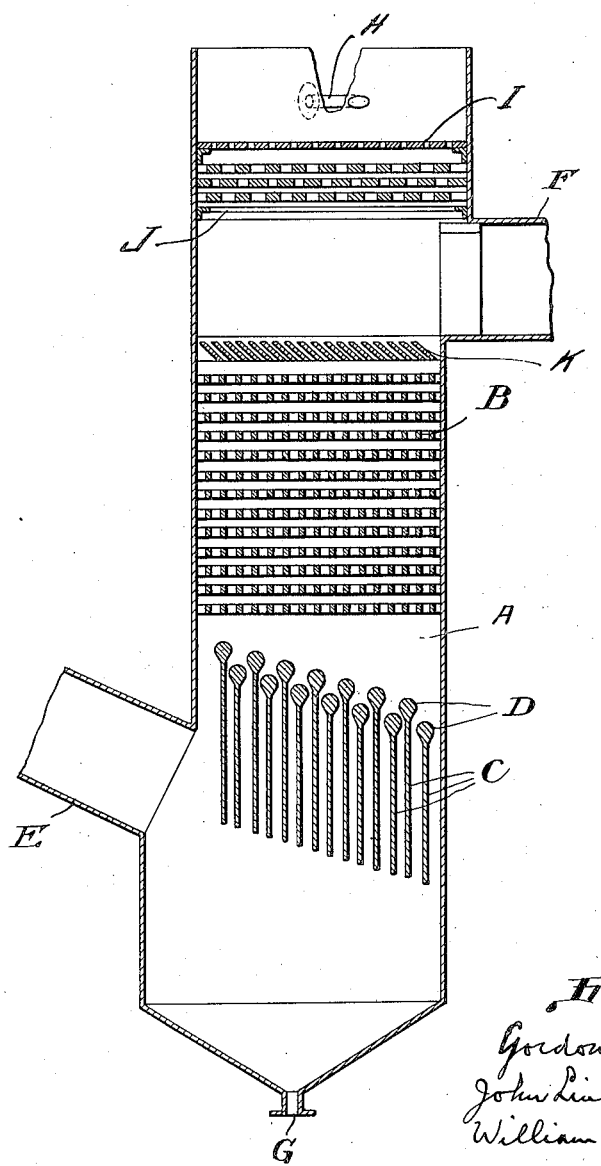

2,056,430

UNITED STATES PATENT OFFICE 2,056,430

GAS SCRUBBER

Gordon Nonhebel, John Lindon Pearson, and William Learmonth, Norton-on-Tees, England, assignors to Imperial Chemical Industries Limited, a corporation of Great Britain Application January 28, 1935, Serial No. 3,844
In Great Britain February 5, 1934

14 Claims. (Cl. 261—112)

This invention relates to the wet purification of gases in scrubbers containing packing, and aims at preventing dust and scale adhesions to the said packing. It has particular application to the removal of dust and oxides of sulphur from boiler flue gases, but it may be applied with advantage to all cases of gas scrubbing where deposits of silt and/or scale are liable to form on the packing.

When boiler flue gas or the like is scrubbed for the removal of dust and oxides of sulphur in a packed tower containing packing elements fed with films of aqueous washing media treated with lime or chalk, the bulk of the liquor being constantly recirculated through the scrubber, it is found that some silting and/or scaling may occur on the packing elements first encountered by the gases or last encountered by the liquor. Such silting may be due to a high dust content in the gases, whereas scaling may be due to the formation of a highly super-saturated solution of calcium sulphite and sulphate in contact with the lowest packing elements.

According to the present invention, silting and scaling are substantially prevented by arranging special packing elements immediately below and/or above the main body of packing, which are so proportioned that the rate of absorption of dust and/or sulphur oxides is less rapid per unit depth of the scrubber than in the rest of the packing, and by feeding upon these special elements a substantially greater quantity of water in order to give a thicker film than that flowing over the elements in the main body of packing.

In the case of grid or lattice packed scrubbers, the special elements are made considerably deeper than is necessary for efficient scrubbing, so that the average velocity of the thick film of liquor flowing over them is higher than in the main body of packing. In this manner the rate of absorption per square foot of scrubbing surface and the rate of absorption per unit volume of scrubber liquor are lower than in the main body of packing, whilst the high velocity and thick film of liquor also substantially reduce the tendency for scale or dust adhesions to occur on the scrubbing surfaces.

In the case of co-current scrubbing of very dusty gases, it may be necessary to provide the special elements with attendant liquor feeding devices both at the top or gas inlet end, in order to prevent silting by dust, as well as at the liquor exit end, in order to prevent scaling.

Since the gas usually enters the scrubber from the side and then passes vertically upwards or downwards through the packing, the special elements preferably extend over the whole width of the tower and are varied in depth so as to assist in the uniform distribution of the gas over the full cross-section of the packing. This arrangement also enables extra scrubbing surface to be fitted into an otherwise empty section of the scrubber and thus reduce the overall height of the scrubber for the same performance.

Since the liquor rate to the tower is fixed, the higher liquor rate on the special elements can most conveniently be obtained by spacing the special elements at a greater pitch than the elements of the main body of the scrubber packing. The liquor for irrigating these special elements is collected on enlarged section tops, for example, members of pear shaped cross section, which are staggered so as to overlap slightly in plan thus ensuring the collection of all the available liquor for washing the elements without introducing a high gas pressure drop. Alternatively it may be found convenient to provide one or more of the tiers of deeper elements with the upper portion inclined, for example, with winged tops or with parallel inclinations similar to a venetian blind. If the deep plates are constructed from wood, provision should be taken to prevent warping, for instance, by employing a number of parts in making up the complete element.

In the case of scrubbers containing vertical corrugated sheet elements between which the gas passes transversely, the horizontal distance apart of the elements and/or the horizontal distance apart of the corrugations would be increased towards the gas inlet whilst the liquor feed tank or nozzles would be arranged to give a greater flow per unit peripheral length of element section.

The single figure of the drawing shows a longitudinal section of one embodiment of the invention.

In one embodiment of the invention illustrated in the accompanying drawing, a grid packed countercurrent scrubber A which is 4 feet square, contains a 4 foot depth of grids of 1 inch deep wooden laths B spaced at ¾ inch pitch. The special elements consist of fourteen deep plates C arranged with their tops D in staggered formation opposite the gas entrance. The elements C are 3 ft. 9 ins. wide, alternate elements being 3 ft. 3 ins. and 2 ft. 9 ins. deep respectively, and spaced 3 ins. apart. Enlarged pear shaped section tops D are fitted, of 2½–3 ins. cross section, for the collection of the liquor in films upon them. The elements may be arranged with their lower ends in stepwise formation downwards from the gas inlet E, or they may have their lower ends at a uniform level. Providing the tops are arranged to overlap slightly in plan, those of alternate elements may be at the same level throughout, or they may also be arranged in stepwise formation.

Liquor may be supplied to the scrubber by any appropriate means comprising, in the illustrative example, a supply pipe H which supplies and maintains a head of liquor over the perforated plate I. The rain of liquor passing through said plate falls upon the gridwork J which evenly distributes the liquor and delivers it to the inclined elements K which in turn feed the liquor to the top elements of packing B.

In operation, gas enters the scrubber A through the duct E, where its distribution over the entire section of the scrubber or tower is assisted by means of the elements C. The enlarged upper ends or tops D collect liquor which drops from the packing B and distribute it uniformly over the elements C. The gas passes upwardly through the elements C and through the packing B, which is showered with aqueous washing media or scrubbing liquor in such a way that the scrubbing liquor flows in film formation over the packing, the gas being purified by contact with the scrubbing liquor and the purified gas flowing out through the outlet F, the scrubbing liquor, together with impurities removed from the gas, falling to the bottom of the tower and passing out through the outlet G.

As many varied and apparently widely different embodiments of this invention may be made without departing from the spirit and scope thereof, it is to be understood that we do not limit ourselves to the specific embodiments thereof, except as defined in the appended claims.

We claim:—

1. A gas scrubber comprising a main body of packing and special substantially vertically arranged elements located at at least one end of the same, and means for delivering to said special elements a greater proportion of scrubbing liquor per unit area than that supplied to a unit area of the main body of packing whereby said special elements have a lower absorption efficiency per unit depth than the latter.

2. A gas scrubber as set forth in claim 1, in which the main body of packing in the tower consists of superposed tiers of thin laths and the special elements consist of relatively deep plates spaced at a greater distance apart than the said laths, the means for delivering to said plates a greater proportion of scrubbing liquor per unit area than that supplied to a unit area of the main body of packing being carried by said special elements.

3. A gas scrubber as set forth in claim 1, in which the main body of packing in the tower consists of superposed tiers of thin laths and the special elements consist of relatively deep plates spaced at a greater distance apart than the said laths, the tops of said plates being modified to collect descending scrubbing liquor and to deliver it in film formation over the plates.

4. A gas scrubber comprising a main body of packing and special elements located at at least one end of the same, said special elements having the form of relatively deep plates arranged vertically and side by side, means being provided for delivering to said plates a greater proportion of scrubbing liquor per unit area than that supplied to a unit area of the main body of packing.

5. A gas scrubber comprising a main body of packing and special elements located at at least one end of the same, said special elements having the form of relatively deep plates arranged vertically and side by side, the tops of said plates being of pear shaped cross section and adapted to collect descending scrubbing liquor and to deliver it in film formation over the plates.

6. A gas scrubber as set forth in claim 5, in which the tops of the plates are staggered so as to leave no directly vertical passage through them.

7. A gas scrubber as set forth in claim 5, in which the packing is arranged in a tower and the gas inlet is at the bottom of the same, the deep plates being located opposite said inlet and being varied in depth to distribute the gas over the whole cross-section of the tower.

8. A gas scrubber as set out in claim 5, in which the packing is arranged in a tower and the gas inlet is at the bottom of the same, the plates being located opposite said inlet and their bottom edges being stepped downwardly away from the gas inlet so as to distribute the gas over the whole cross-section of the tower.

9. A gas scrubber comprising a main body of packing of the grid or lattice type and adapted for vertical flow of gas and liquor, and relatively deep plates arranged vertically side by side at the gas inlet end of the packing in the path of the scrubbing liquor, the said plates being spaced at a greater distance apart than the elements making up the main body of packing and their tops being enlarged so as to adapt them to receive a greater proportion of scrubbing liquor per unit area than that supplied to a unit area of the main body of packing.

10. A gas scrubber comprising a main body of packing of the grid or lattice type and adapted for vertical flow of gas and liquor, and relatively deep plates arranged vertically side by side at the gas inlet end of the packing in the path of the scrubbing liquor, the said plates being spaced at a greater distance apart than the elements making up the main body of packing and their tops being spread so as to adapt them to receive a greater proportion of scrubbing liquor per unit area than that supplied to a unit area of the main body of packing.

11. A gas scrubber comprising a main body of packing of the grid or lattice type and adapted for vertical flow of gas and liquor, and relatively deep plates arranged vertically side by side at the gas inlet end of the packing in the path of the scrubbing liquor, the said plates being spaced at a greater distance apart than the elements making up the main body of packing and their tops being provided with lateral projections so as to adapt them to receive a greater proportion of scrubbing liquor per unit area than that supplied to a unit area of the main body of packing.

12. A gas scrubber as claimed in claim 11, in which the tops of the plates are staggered so as to leave no direct vertical passage through them.

13. A gas scrubber as claimed in claim 11, in which the packing is arranged in a tower and the gas inlet is at the bottom of the same, the plates being located opposite said inlet and their bottom edges being stepped downwardly away from the gas inlet so as to distribute the gas over the whole cross-section of the tower.

14. A gas scrubber comprising a main body of packing adapted to be irrigated with continuous films of liquor, special substantially vertically arranged elements located at at least one end of said packing, and means for delivering to said special elements a substantially thicker film of liquor flowing at greater velocity than that flowing over said main body of packing.

GORDON NONHEBEL.
JOHN LINDON PEARSON.
WILLIAM LEARMONTH.